UNITED STATES PATENT OFFICE.

DAVID JOHN GILES AND JAMES EARL GILES, OF McKEESPORT, PENNSYLVANIA.

PROCESS OF EXTRACTING TUNGSTEN AND SIMILAR METALS FROM THEIR ORES.

1,388,857.  Specification of Letters Patent.  Patented Aug. 30, 1921.

No Drawing.  Application filed September 30, 1918. Serial No. 256,214.

*To all whom it may concern:*

Be it known that we, DAVID JOHN GILES and JAMES EARL GILES, both residents of McKeesport, in the county of Allegheny and State of Pennsylvania, have invented a new and useful Improvement in Processes of Extracting Tungsten and Similar Metals from Their Ores, of which the following is a specification.

This invention relates to a process of extracting from their ores such metals as tungsten, vanadium, uranium, and molybdenum.

The object of the invention is to provide a process for extracting the above named metals from their ores, or from concentrates of such ores, or from residues resulting from partial extraction of said metals from their ores, whereby the metals can be produced more economically and extracted more completely than with the processes heretofore in use.

In our Patent No. 1,293,403, issued Feb. 4, 1919, we described and claimed a process of extracting tungsten and similar metals from their ores by forcing a reaction between the finely ground ore and a water solution of some readily water soluble alkaline compound, preferably sodium hydrate, preferably in a closed vessel and under pressure, thereby replacing the hydroxid radical of the reagent by the metal of the ore and forming an alkaline metal solution; then separating said solution from the gangue; and thereafter treating the solution with calcium compounds to first precipitate the impurities,—silica and phosphorus,—and afterward the metal. With certain kinds of ores, or ores not ground sufficiently fine, said treatment leaves in the gangue a small portion of the metal of the ore which was not dissolved by the treatment with the sodium hydrate solution.

The present method has for its purpose to recover all of the metal in the ore, and to cheapen the process, as well as to recover the metal remaining in the gangue or residues from other processes of treating similar ores. It cheapens the process in that it does not require the ore to be ground as fine as does the former method, as well as being adapted for the recovery of ores from the residues from other processes of treating similar ores.

In general, the process consists in grinding the ore but not to as fine a condition as required by the former process, and then forcing a reaction between the ore and some alkaline solution readily soluble in water, thereby producing an alkaline solution of the metal of the ore, separating this solution from the gangue, treating the resultant liquid as described in the former application to remove the impurities and then recover the metal therefrom; and in addition comprises the mechanical concentration of the gangue or residue, in order to recover therefrom any remaining or untreated metals of the ore.

The process will be explained for the extraction of tungsten from its ore with the use of sodium hydrate as the alkaline compound for dissolving the metal of the ore, and milk of lime as the calcium compound for precipitating the impurities and the metal in solution. The reactions for the treatment of other ores or by the use of other reagents will be similar to those that will be described.

The tungsten ore is ground to a relatively small size, say to pass through a sieve of about 100 meshes per inch, and is then treated with a water solution of sodium hydrate, preferably in a closed vessel to which heat is applied, thus generating steam in the vessel and producing a pressure and a higher temperature than can be obtained by boiling in an open vessel. Under these conditions the reaction takes place vigorously, but the same result can be obtained by boiling in an open vessel, provided more time is given. This step of the process can be carried out in a closed revolving drum, provided with balls or cylinders whereby the ore is pulverized while being subjected to the foregoing action of the reagent under steam pressure, as illustrated and described in the application above identified, but preferably is carried out in a stationary vessel or, indeed, can be carried out in an ordinary autoclave. The pressure which we prefer to maintain in such vessel is about 60 pounds per square inch. The treatment of the ore in the manner described accelerates the reaction whereby the hydroxid radical of the sodium hydrate is replaced by the tungsten of the ore, forming a solution of sodium tungstate according to the following equations:

$$2NaOH + WO_3 = Na_2WO_4 + H_2O$$
$$2NaOH + SiO_2 = Na_2SiO_3 + H_2O$$

The solution is then separated from the gangue, either by decantation or preferably by filtration. In the reaction in the closed vessel some of the silica and phosphorus goes into solution as silicate and sodium phosphate, as indicated by the above equations, and these must be removed if the metals are to be produced in substantially pure form. This, and the recovery of the metal from the solution is done as described in the application above identified, that is to say, said solution is first cooled to a low temperature, such as room temperature, to-wit, in the neighborhood of 60° to 70° F., and diluted until its sodium hydrate content is about .8 of 1%, which can be conveniently done by adding cold water to the hot solution. The calcium compound, to-wit, milk of lime, is then added and at this temperature can be safely added in excess, and acts to precipitate the phosphorus and silica as insoluble calcium compounds but does not precipitate the tungsten or other metal. This reaction is according to the following equations:

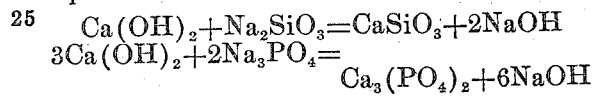

$$Ca(OH)_2 + Na_2SiO_3 = CaSiO_3 + 2NaOH$$
$$3Ca(OH)_2 + 2Na_3PO_4 = Ca_3(PO_4)_2 + 6NaOH$$

This solution is then separated from the precipitate, preferably by filtering, and is again treated with the calcium compound, to-wit, the milk of lime, and its temperature is raised to approximately 200° F. and at this temperature the tungsten or other metal is precipitated as insoluble calcium tungstate, which is a powder when dry, according to the following formula:

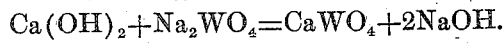

$$Ca(OH)_2 + Na_2WO_4 = CaWO_4 + 2NaOH.$$

This precipitate is separated from the liquid by decantation or filtration, and is then treated with hydrochloric acid and produces calcium chlorid and so-called hydrate tungstic acid, according to the following equation:

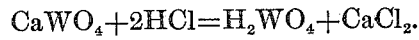

$$CaWO_4 + 2HCl = H_2WO_4 + CaCl_2.$$

The tungstic acid is then washed, dried, and reduced, by means of carbon, to metallic tungsten.

While in this process the alkaline compound is preferably sodium hydrate (NaOH), on account of the energy of its reaction, yet other alkaline compounds readily soluble in water can be used, such as soda ash, i. e., sodium carbonate, ammonium hydrate, or the like; or various potassium compounds readily soluble in water can be used. So, too, while milk of lime or lime in some other form is preferred as the calcium compound for precipitating the impurities and the tungsten, other calcium compounds, such as calcium chlorid, or any compound of other alkaline earth-metals, may be used.

The method so far described is substantially that described and claimed in the application above identified.

According to the improved method, the chemical treatment of the solutions with the calcium compounds, as above described, both for precipitating the impurities and for precipitating the tungsten, is carried out while agitating the solution, which may be done by mechanical means, but preferably by compressed air. It has been found that this greatly accelerates the reactions, and reduces the time required for carrying out the process.

Another feature of the improved method consists in recovering from the gangue or residue, filtered out from the hot solution resulting from the first treatment of the ore, any undissolved portion of tungsten remaining therein, which is in the form of free crystals of the original tungsten mineral. This is accomplished by any of the well-known methods for concentrating ores, such, for instance, as on a Wilfley table, or a Diester-Overston table, or similar apparatus, or by the well known hydraulic classification methods. The gangue is taken directly from the filter to the concentrating apparatus where clear crystals of the original tungsten mineral are recovered. The quality of the tungsten concentrate obtained from the residue by this mechanical process depends upon the fineness to which the original ore is ground. For instance, if the original ore is ground to less than 200 mesh, the tungsten mineral is almost free from quartz and can be used as such, but if the original ore is not ground so fine, the concentrate may contain considerable quartz. In such case it can be ground to a finer mesh than originally, say to a 200 mesh, and retreated with the sodium hydrate as above described.

In any event, the chemical treatment of the ore with the sodium hydrate frees the mineral particles from the quartz or aluminates and renders any tungsten mineral remaining in the gangue or residue readily extractable by these well known concentration methods, so that in this way substantially all of the tungsten metal in the ore can be recovered. The amount of tungsten metal recovered by each step of the process, to-wit, the chemical process and the mechanical process, depends upon the character of the ore and the fineness to which it has been ground. As a general thing, the finer the ore is ground the larger the percentage of tungsten metal taken out by the chemical treatment and the relatively smaller the amount recovered by the mechanical treatment.

This combination of the chemical process and the mechanical process makes it possible to recover from various ores practically all of the metal contained therein. If the ore is subjected to the chemical treatment only, a certain percentage of the metal would be lost in the gangue, whereas if mechanical treatment alone is resorted to the finer ground portion as well as the mineral particles which are covered by quartz or aluminates would be lost in the overflow from the mechanical concentrating apparatus. But by combining the two, that is, first treating the ground ore chemically, all of the metal in the finer portions is dissolved by the chemical treatment, and any metal remaining in the coarser portions is recovered by the mechanical treatment.

The method is directly applicable to either raw ore, or to second grade concentrates from various mechanical methods of concentration, or to residues or gangue resulting from various chemical treatments of ores.

The sodium hydrate used as the original reagent, and the calcium chlorid which is produced by treating the calcium tungstate with hydrochloric acid, can be recovered from the residual liquor in the manner described in the application above identified, but as these treatments are not included within the claims hereof, they need not be described.

Among the tungsten ores to which the process is applicable are ferberite, i. e. iron tungstate, hubnerite, i. e. manganese tungstate, wolframite, which is a mixture of manganese tungstate and iron tungstate, scheelite, i. e., calcium tungstate, as well as to practically all of the ores of vanadium, uranium, and molybdenum.

We claim:

1. In the process of extracting metals of the character specified from their ores or concentrates, the steps which consist in treating the same with a solution of a readily water soluble alkaline compound, under pressure and heat, thereby forming a soluble alkaline-metal-solution, separating the solution from the gangue, and mechanically treating the gangue to recover the ore residue.

2. In the process of extracting metals of the character specified from their ores or concentrates, the steps which consist in treating the same with a solution of sodium hydrate, under pressure and heat, thereby forming a sodium metal solution, separating the solution from the gangue, and mechanically treating the gangue to recover the ore residue.

3. In the process of extracting tungsten from its ores or concentrates, the steps which consist in coarsely grinding the ore, treating it with a readily water soluble alkaline compound, under pressure and heat, thereby forming an alkaline metal solution, separating the solution from the gangue, and mechanically treating the gangue to recover the undissolved crystals of tungsten ore.

4. In the process of extracting tungsten from its ores or concentrates, the steps which consist in roughly grinding the ore, treating it with a solution of sodium hydrate, under pressure and heat, thereby forming soluble sodium tungstate, separating the solution from the gangue, and mechanically treating the gangue to recover the undissolved crystals of tungsten ore.

5. In the process of recovering metals of the character specified, the steps consisting in treating roughly ground ore with a chemical reagent to free the particles of metal bearing ore from the quartz or aluminates, and subjecting the gangue so formed to mechanical concentration and thereby recovering the particles of metal bearing ore.

6. In the process of recovering tungsten, the steps of which consist in treating roughly ground tungsten ore with a chemical reagent to free the metal bearing particles from the quartz or aluminates, and subjecting the gangue so formed to mechanical concentration and thereby recovering the crystals of tungsten bearing ore.

In testimony whereof, we have hereunto set our hands.

DAVID JOHN GILES.
JAMES EARL GILES.

Witness:
CARL F. MORLOCK.